Nov. 6, 1962     M. A. CROOKS     3,062,476
HAND REEL
Filed July 31, 1961
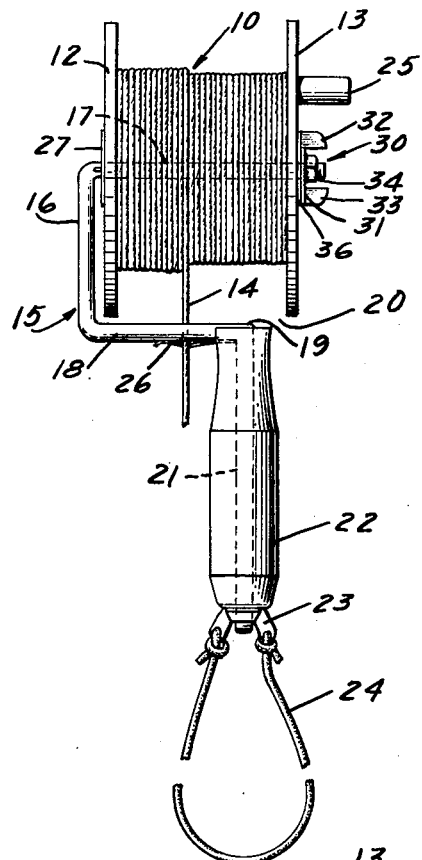
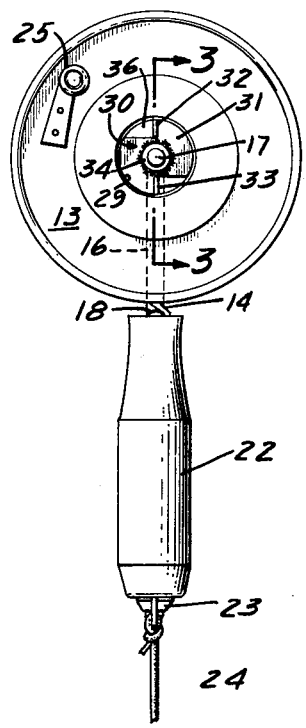
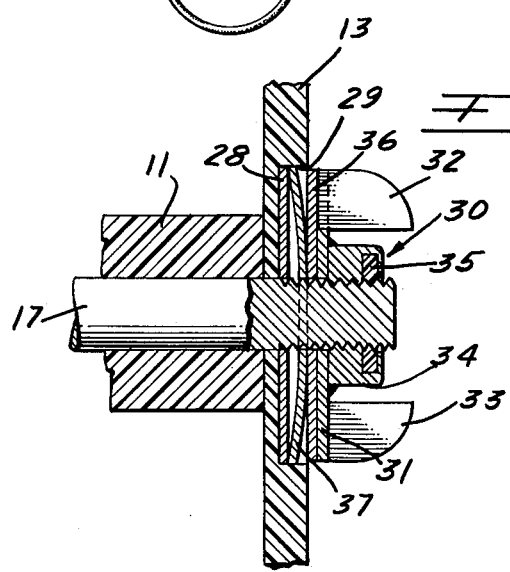
Milton A. Crooks,
INVENTOR.
WHANN & McMANIGAL
Attorneys for Applicant
by Robert M. McManigal

3,062,476
HAND REEL
Milton A. Crooks, Apple Valley, Calif., assignor of ten percent to Willis P. Bootz, Apple Valley, Calif.
Filed July 31, 1961, Ser. No. 127,938
2 Claims. (Cl. 242—96)

The present invention relates generally to a hand reel upon which an elongate flexible filamentary member such as a string and the like may be wound and unwound.

It is one object of the herein described invention to provide a hand reel of simple construction, which may be economically produced, and which may be utilized for general and multitudinous purposes, such as fishing, flying kites, chalk lines, and the like.

A further object of the invention is to provide a hand reel having a simple and easily accessible winding crank, and braking mechanism.

A still further object is to provide in such a reel, handle support means which are so positioned as to prevent tilting of the winding spool of the reel during a winding operation.

It is also an object to provide novel releasable string gripping means which may be readily applied to the running end of the string or other filamentary material being wound on the spool of the reel.

Other objects of the invention will be brought out in the following part of the specification, wherein detailed description is for the purpose of fully disclosing the invention without placing limitations thereon.

Referring to the accompanying drawings, which are for illustrative purposes only:

FIG. 1 is a plan view of a hand reel embodying the features of the present invention;

FIG. 2 is a side elevation of the same as it appears when looking toward the crank end of the winding spool; and FIG. 3 is an enlarged fragmentary sectional view, taken substantially on line 3—3 of FIG. 2, and showing details of construction of the braking means.

Referring more specifically to the drawings, for illustrative purposes, the reel is shown in FIG. 1 as comprising a winding spool 10 having a cylindrical hub 11 (FIG. 3) which is secured at its opposite ends to end flanges 12 and 13, respectively. The winding spool may be constructed of any suitable material and may be formed from any of the available plastics having proper characteristics. The winding spool serves to receive thereon a wound filamentary material 14, such as a string and the like.

In order to facilitate winding of the filamentary material on to the spool, provision is made for rotatably supporting the spool upon a hand carrying support as generally indicated by the numeral 15, which will now be described in detail. The hand carrying support includes a U-shaped member 16 which is shown as constructed from a metallic rod of circular cross section, this rod being deformed to provide one leg 17 which serves as an axle for the spool 11. The other leg, as indicated by the numeral 18, extends in parallel relation to the leg 17, but is outwardly spaced with respect to the periphery of the end flange 12, and extends past this end flange to a leg terminus as indicated by the numeral 19 in spaced relation to the end flange 13, thus leaving an opening 20 through which the running portion of the filamentary material may be passed so as to facilitate hand winding or unwinding on the spool.

From the end terminus 19, the rod material utilized for the U-shaped member may be extended to form an integral shank 21 which extends in right angle relation to the axle 17 and serves as a mounting for a handgrip 22 of wood or other suitable material. The handgrip is secured against endwise removal from the shank 21 by means of a wing nut 23 having threaded engagement with the shank end. The wings of the wing nut are provided with openings through which the ends of a lanyard 24 may be secured so as to serve as a safety restraint when the handgrip 22 is inadvertently or otherwise released. Also, this lanyard, being formed in a loop, also serves as a support by which the reel may be hung from a belt or the like of the user.

The spool may be manually rotated on its axle by means of a crank 25 affixed to and rotatably supported on flange 13. At any time when the winding of the filamentary material is terminated, the running portion thereof may be releasably anchored by engaging under a spring finger 26 secured to extend along the other leg 18 adjacent the handgrip inner end.

It will be observed that the handgrip is offset from the midline between the end flanges 12 and 13 in a direction so as to place it in closer proximity to the end flange 13, than to the end flange 12. By offsetting the handle in this manner, the forces attending the winding operation by means of the crank 25, which might tend to cause a tilting of the winding spool, are materially minimized so that little if any tilting takes place.

Simple braking means are provided which enable the spool ends to be adjustably clamped between a bearing washer 27 engaged with the outer surface of end flange 12, and a bearing washer 28 seated in an annular recess 29 centrally of the outer surface of end flange 13, as shown most clearly in FIG. 3.

The clamping pressure, and consequent braking effect is varied by means of a wing nut structure as generally indicated by the numeral 30, and shown as comprising an annular disc member 31 having integrally formed projecting wings 32 and 33 which are struck up from marginal portions of the annular disc member. A nut 34 is bonded as by welding to the disc member 31, this nut having a fibre insert 35 which serves to frictionally retain the nut in adjusted rotative position on the associated threaded end of the one leg 17 of the U-shaped member. The wing nut structure bears against a washer 36, and a dished or cupped spring 37 is interposed between the washer 36 and the washer 28. Thus, by tightening and loosening the wing nut structure 30, the braking friction opposing rotation of the winding spool 10 may be varied to meet varied conditions of operation.

Various modifications may suggest themselves to those skilled in the art without departing from the spirit of my invention, and, hence, I do not wish to be restricted to the specific form shown or uses mentioned, except to the extent indicated in the appended claims.

I claim:

1. A lightweight portable hand reel, comprising: a winding spool having opposite end flanges; a U-shaped member, one leg of said member providing an axle upon which said spool is rotatably supported, and the other leg extending in spaced relation to and past the periphery of one of said end flanges and terminating in a right angled shank portion; a handle grip on said shank; a handle retaining wing nut on the outer end of said shank; a looped lanyard having its ends anchored respectively in the wings of said nut; a crank carried by the other of said end flanges for turning the spool on said axle; and adjustable friction braking means between said one leg and said other of said end flanges for resistingly opposing rotation of said spool.

2. A lightweight portable hand reel for an elongate flexible member, comprising: a winding spool including a cylindrical hub having opposite end flanges; a U-shaped member having substantially parallel leg portions, one leg of said member providing an axle upon which the hub of said spool is rotatably supported, the other leg extending in spaced relation to and past the periphery of one of said end flanges, but having an end termination in closely spaced relation to the other of said end flanges; handle means secured to said end termination extending at right angles to said associated leg, whereby said handle axis is positioned in relatively close proximity to the plane of rotation of said other of said end flanges; a crank carried by the other of said end flanges for turning the spool on said axle; adjustable friction braking and locking means between said one leg and said other of said end flanges for selectively resistingly opposing rotation of said spool and locking it against rotation; and a spring clip carried by said other leg between its U-connection and said handle for releasably gripping the flexible member.

References Cited in the file of this patent

UNITED STATES PATENTS

| | | |
|---|---|---|
| 320,555 | Haslam | June 23, 1885 |
| 514,104 | Wickey | Feb. 6, 1894 |
| 2,047,705 | Porter | July 14, 1936 |
| 2,269,808 | Cabassa | Jan. 13, 1942 |